United States Patent
Zinsser-Krys et al.

(10) Patent No.: US 6,581,496 B2
(45) Date of Patent: Jun. 24, 2003

(54) SMALL SIZE TRANSMISSION

(75) Inventors: Harry Zinsser-Krys, Kelheim-Weltenburg (DE); Harald Lukosz, Schorndorf (DE)

(73) Assignee: Hans Heidolph GmbH & Co. KG, Kelheim (DE)

( * ) Notice: Subject to any disclaimer, the term of this patent is extended or adjusted under 35 U.S.C. 154(b) by 0 days.

(21) Appl. No.: 09/897,055

(22) Filed: Jul. 3, 2001

(65) Prior Publication Data
US 2002/0035883 A1 Mar. 28, 2002

(30) Foreign Application Priority Data

Jul. 6, 2000 (DE) .......................................... 100 32 821

(51) Int. Cl.$^7$ .............................................. F06H 57/02
(52) U.S. Cl. ..................................... 74/606 R; 74/413
(58) Field of Search ...................... 74/413, 414, 421 A, 74/606 R; 29/893.1, 893.2; 384/584

(56) References Cited

U.S. PATENT DOCUMENTS

| | | | | |
|---|---|---|---|---|
| 2,348,145 A | * | 5/1944 | Perkins | 74/606 R X |
| 2,623,406 A | * | 12/1952 | Hansen | 74/606 R |
| 2,762,232 A | * | 9/1956 | Bade | 74/421 A |
| 4,089,216 A | * | 5/1978 | Elias | 73/136 R |
| 4,441,378 A | * | 4/1984 | Ponczek | 74/414 |
| 4,626,114 A | * | 12/1986 | Phillips | 74/606 R X |
| 5,197,345 A | * | 3/1993 | Rose | 74/421 A |
| 6,202,507 B1 | * | 3/2001 | Phillips | 74/606 R |
| 6,253,640 B1 | * | 7/2001 | Phillips | 74/606 R |

FOREIGN PATENT DOCUMENTS

| | | |
|---|---|---|
| DE | 1 019 871 | 11/1957 |
| DE | 1 425 813 | 4/1971 |
| DE | 30 34 651 | 4/1982 |
| DE | 42 27 702 | 2/1992 |
| DE | 94 04 282 | 6/1994 |
| DE | 44 16 315 | 2/1996 |
| DE | 197 33 546 | 4/1999 |
| EP | 0 452 739 | 9/1994 |
| EP | 0 974 774 | 1/2000 |

OTHER PUBLICATIONS

DE–Prospekt, SKF, "Die Werkzeuge für 'Strungsfreien Betrieb'" 1996, MP 200G/9603, pp. 42, 44 & 45.

* cited by examiner

Primary Examiner—David A. Bucci
Assistant Examiner—Colby Hansen
(74) Attorney, Agent, or Firm—Venable; Catherine M. Voorhees

(57) ABSTRACT

A transmission adapted for use with a motor comprises a basic transmission, which comprises a basic transmission input shaft, borne in a housing via rolling bearings, at least one subsequent transmission stage arranged in the housing, and a variance gear designed for meshing with a drive pinion of the motor and pressed onto the basic transmission input shaft from the input side of the transmission. A support is arranged in the housing, in fixed position relative to the housing, in such a manner that the basic transmission input shaft contacts the support, under the effect of the pressure force necessary for pressing the variance gear onto the basic transmission input shaft, so that the support essentially bears the pressure force and distributes it over the housing.

18 Claims, 2 Drawing Sheets

SMALL SIZE TRANSMISSION

BACKGROUND OF THE INVENTION

1. Field of the Invention

The invention relates to a small size transmission adapted for use with a motor, comprising a basic transmission which has a basic transmission input shaft, borne in a housing by means of rolling bearings and at least one subsequent transmission stage which is arranged in the housing and comprises a variance gear adapted for meshing with a drive pinion of the motor and pressed onto the basic transmission input shaft from the input side of the transmission. Moreover, the invention relates to a transmission series comprising such a small size transmission, as well as to a process for assembling such a small size transmission.

2. Description of Related Art

From EP 0452739B1, a transmission series is known in which a plurality of transmissions of the same size, but with different transmission ratios, are produced by combining a so-called variance stage of the transmission with an identical basic transmission. The variation of the transmission ratios is realized by different pairs of pinions and gears in the variance stage, whereas the basic transmission, consisting of further transmission stages, stays unaltered. According to this previous publication, it is possible to minimize the number of constructive parts necessary for the production of the variance stage by using an appropriate correlation of the constructive sizes and nominal transmission ratios of the variance stage. This makes it possible to provide a large number of transmission ratios of plural-stage transmissions by combining, for each constructive size, an identical basic transmission (or some few basic transmissions) with a large number of variance stages.

SUMMARY OF THE INVENTION

On this basis it is an object of the invention to further minimize the production expenses for a transmission of the kind described.

To this end, the invention provides a support element in the housing, in fixed position relative to the housing, in such a manner that the basic transmission input shaft contacts, under the effect of the pressure force necessary for pressing the variance gear onto the basic transmission input shaft, the support, whereby the support essentially bears the pressure force and distributes it over the housing.

In the operating mode, when the small size transmission is connected to a corresponding motor (or, more generally, a drive) the variance gear meshes with the drive pinion of the motor. The drive pinion is commonly located on the motor shaft (drive shaft). Together with the variance gear, it forms the first stage of the transmission, which is a variance stage according to EP 0452739B1. Although, consequently, the pinion is a functional component of the transmission, in practice, it is constructively connected to the drive rotor. However, the invention also refers to transmission embodiments in which the pinion of the variance stage is fixed to a shaft which is a constructive component of the transmission, and which is coupled to the motor (e.g. by a flange).

The basic transmission comprises the transmission stages which follow the variance stage and are driven by the basic transmission input shaft. It comprises at least one, but often up to three further transmission stages. The overall transmission ratio of the small size transmission is the product of the transmission ratios of the variance stage and the further transmission stages. The housing, in which the basic transmission input shaft and at least one more transmission stage are located, forms the stationary part of the basic transmission, which is stationary in relation to the moving transmission parts, and to which the bearings of the gear shafts are fixed. The invention is not limited to a housing which is itself closed nor to a housing closed in conjunction with the motor.

According to the invention, the basic transmission input shaft comes in contact with the support element which is in a fixed position relative to the housing, when the variance gear is pressed to the preassembled basic transmission. The support element bears the pressure force necessary for pressing and distributes it over the housing. Thus, the power flow bypasses the rolling bearings of the basic transmission input shaft, so that damage of these due to the pressing action is avoided. Thus, it is possible to press the variance gear onto the readily assembled basic transmission with an axial force which is much higher than the axial load capacity of the rolling bearings in which the basic transmission input shaft is rotated. For the production of the transmissions, this has the essential advantage that a relatively small number of different basic transmissions can be pre-produced and held in stock, whereas the desired transmission ratios demanded by a customer can be realized simply and in short term, by pressing a variance gear providing (in conjunction with the appropriate pinion) the desired transmission ratio onto an appropriate basic transmission. This makes it possible to accomplish quickly and economically individual customer requirements, with limited storekeeping, for a vast range of transmission ratios.

It is not necessary to distribute the entire pressure force over the housing. Rather it is sufficient that this force is essentially taken over by the support element in the meaning of "essentially", as to make sure that the rolling bearings of the basic transmission input shaft are not damaged during the pressing action. Preferably, the rolling bearings are ball bearings. The invention, however, also relates to transmissions with other types of rolling bearings, in particular roller bearings of different constructional forms. Subsequently, without limiting the universality, ball bearings are referred to exemplarily.

The procedure for the production of a small size transmission comprises a preliminary assembling step, in which the basic transmission is completely assembled, and a final assembling step, in which a variance gear, chosen according to the requirements, is pressed onto the basic transmission input shaft. This causes a reduction of the production costs as well as the storekeeping costs as compared to the earlier known manufacturing process, in which the variance gear is pressed onto the basic transmission input shaft before assembling the entire transmission. If in the latter case a short delivery time is required, the entire multitude of possible small size transmissions must be preproduced and kept in stock. The number of these is the number of different basic transmissions multiplied by the number of different variance gears, and is much higher than the total of basic transmissions and variance gears which have to be preproduced and to be kept in stock according to the invention.

The pressure force, necessary for pressing-on the variance gear, can be reduced by preheating the gear, as generally known. However, this is only possible to a limited extent, depending on the used material. For example, parts hardened by case hardening can only be heated up to a maximum of 200° C.

The invention is of particular importance for small size transmissions with a relatively small diameter of the basic transmission input shaft. In particular, it can be used for cases in which the diameter of the shaft, in the range of its bearings, is up to about 25 mm, preferably up to about 20 mm, and particularly preferred up to about 15 mm.

Small size transmissions with small shaft diameters have a small contact surface between the shaft and the variance gear and thus require a tight force fit in order to carry the required torque without slipping. Therefore, the force required to press the variance gear onto the shaft, must be relatively high. On the other hand, the haft bearings of small size transmissions are relatively weak and can only bear small axial loads. The invention solves this problem. For example, a pressure force of about 500 N was used for the pressing-on action in the case of a transmission, the ball bearings of which were able to bear a maximum axial force of 80 N.

Due to the design of the invention the basic transmission input shaft contacts, during the operation of the transmission, the support element which is fixed relative to the housing. Therefore a negative influence on the operation (e.g. an inadmissible increase of the operating temperature or a power loss) had to be expected due to increased friction and the resulting abrasion. Surprisingly, tests have shown that this does not occur. Preferably, the support element fixed relative to the housing is designed in such a manner that it is worn off in operation due to the contact with the basic transmission input shaft. Tests have shown that this "running-in process", which does not take place in the production plant, but in the normal operation of the transmission, does not affect the operational behavior to any significant extent. Preferably, the transmission is lubricated with an oil charge which absorbs the abraded particles as a dispersion.

The invention also comprises a series with a plurality of such small size transmissions. Such a series comprises small size transmissions of one or a plurality of constructional sizes, whereas a constructional size is defined by a certain center distance between the drive shaft and the basic transmission input shaft, when the small size transmission is connected to the drive. In order to provide a plurality of desired total transmission ratios for small size transmissions of the same constructional size, the invention starts from a common basic transmission. The desired overall transmission is then achieved by pressing-on in each case a suitable different variance gear for meshing with a respectively fitting drive pinion. A comprehensive series is formed by combining different variance gears with a number of different basic transmissions.

Preferably, the basic transmission input shaft is movable in relation to the housing within a given tolerance range s in axial direction. The tolerance range s of the basic transmission input shaft is limited by two positions, namely a first limiting position towards the input side and a second limiting position towards the opposite side. Furthermore reference is made to the distance between the basic transmission input shaft and the support. This is the distance between those parts of the basic transmission input shaft and the support which contact each other during the pressing-on of the variance gear onto the shaft. This distance varies within the tolerance range of the basic transmission input shaft. In the position of the basic transmission input shaft limiting the tolerance range in input direction this distance is denominated d. Preferably, this distance d is smaller than the tolerance range s. If this dimensioning rule is observed the basic transmission input shaft contacts, when it is shifted during the pressing-on of the variance gear onto the shaft in opposite direction to the input direction, the support before it reaches the opposite tolerance-limited position, in which one or both ball bearings of the basic transmission input shaft would be loaded. In this manner the pressing forces are transferred to the housing, whereas the ball bearings of the basic transmission input shaft are essentially completely bypassed.

BRIEF DESCRIPTION OF THE DRAWINGS

Subsequently the invention is explained on the basis of an advantageous embodiment, referring to the attached figures. The features described can be used individually or in combination in order to create preferred embodiments of this invention. The figures show.

DETAILED DESCRIPTION OF THE INVENTION

Figure 1:
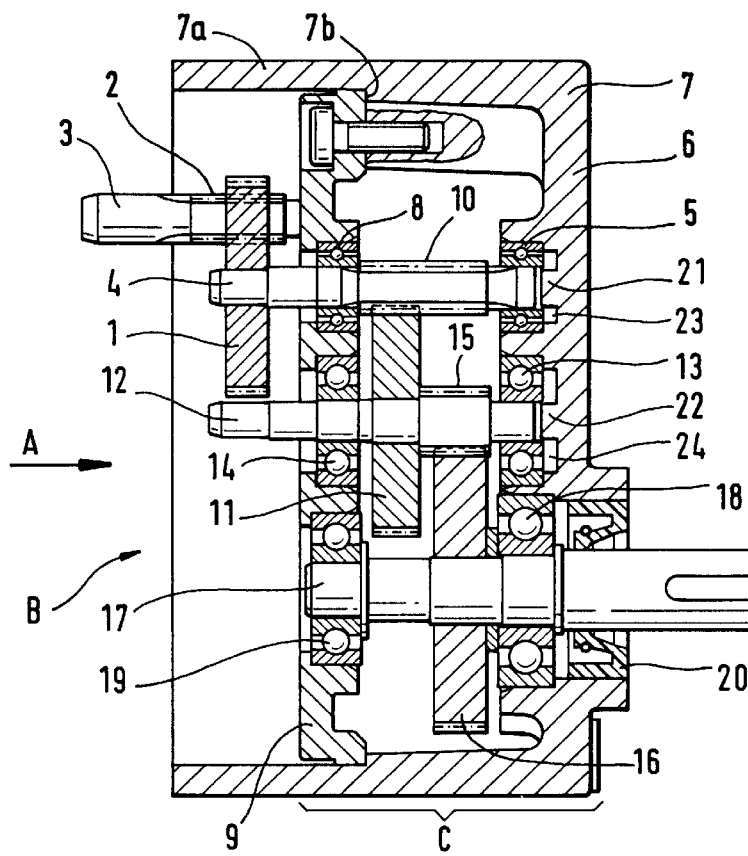
FIG. 1 a sectional view of a completely assembled small size transmission.
Figure 2:
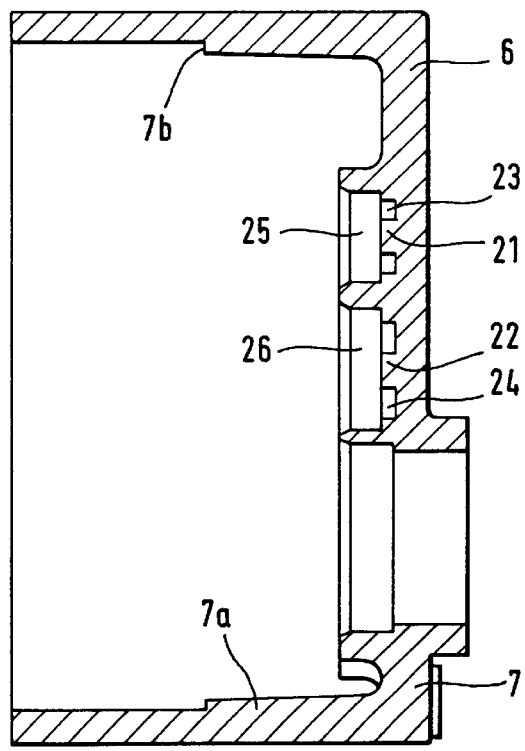
FIG. 2 a view corresponding to FIG. 1, of a pot-shaped part of the housing.
Figure 3:
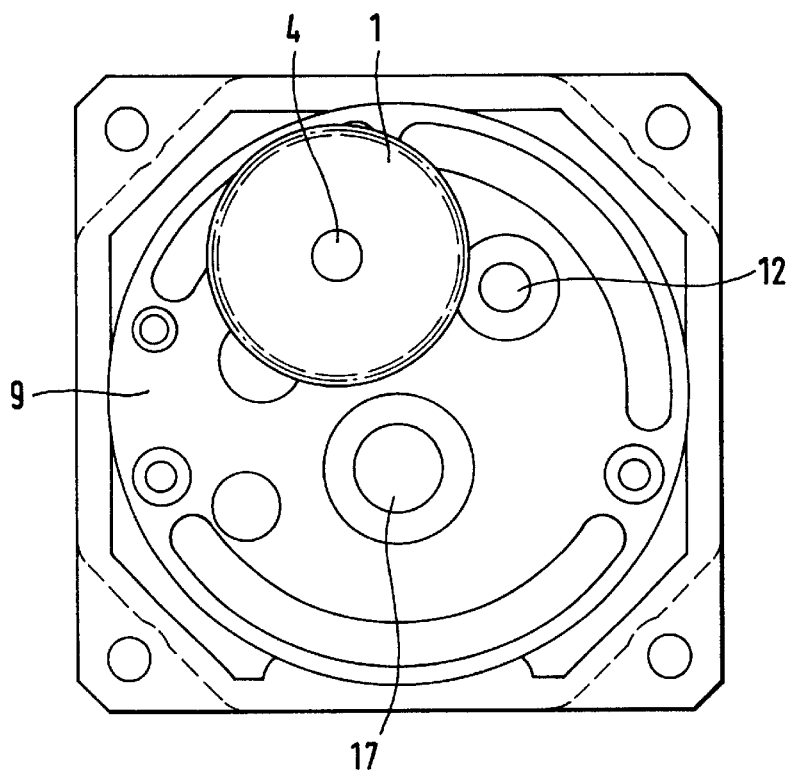
FIG. 3 a view of the small size transmission in input direction (arrow A)

The first stage (variance stage) of the shown transmission comprises a variance gear 1, pressed onto the basic transmission input shaft 4, thus having a fixed, non-slipping connection to it. The side of the transmission where the driving power is fed in (the side where the variance stage is arranged) is denominated input side B. The input direction marked with arrow A is the direction pointing from the input side B into the transmission, parallel to the basic transmission input shaft 4.

The basic transmission input shaft 4 is connected for power transmission to two subsequent transmission stages. The first subsequent transmission stage is formed by a shaft pinion 10 formed at the lateral surface of the basic transmission input shaft 4 and by a gear 11 in mesh with it, connected to a shaft 12 with a rotationally fixed, non-slipping connection. The second subsequent transmission stage has essentially the same design (pinion 15, gear 16, shaft 17). Shaft 17 is the transmission output shaft. The variance gear 1 is in mesh with a drive pinion 2 which is part of a shank 3, which can be coupled by a non-slipping rotary connection to the shaft of a drive motor not shown here. Therefore, the transmission has a total of three stages.

The basic transmission input shaft 4 is borne by a first ball bearing 8 at the input side and by a second ball bearing 5, remote from the input side, in the transmission housing 7, 9. The diameter of the basic transmission input shaft 4 in the area of the bearings 8, 5 is typically 5 to 15 mm. The base 6 has a recess 25 for holding the outer race of the second ball bearing 5. The shafts 12, 17 of the subsequent transmission stages are borne, respectively, by a first ball bearing 14, 19 at the input side and by a second ball bearing 13, 18, remote from the input side, in the transmission housing 7, 9.

The transmission housing 7, 9 essentially consists of a pot-shaped housing part 7 with a base 6 and a circumferential wall 7a. A cover plate 9 is inserted in the pot-shaped housing part 7, in such a manner that it is supported against a projection 7b of the housing part 7. The cover plate 9 forms a bearing carrier plate for the first ball bearings 8, 14, 19 of the input side. The base 6 of the pot-shaped housing part 7 forms a second bearing carrier wall for the second ball bearings 5, 13, 18. The interior space limited by the pot-shaped housing part 7 and the cover plate 9 inserted herein contains all bearings as well as the pinions 10, 15 and the gears 11, 16 of the subsequent transmission stages. These transmission parts form a basic transmission C. The basic transmission C (in the case shown comprising all components except for the variance gear 1, the pinion 2 and the shank 3) can be produced, in a preparatory assembling step, in large quantities and can be kept in stock. In the housing 7, 9 it is protected to a large extent from outer influence. Furthermore, the shown design allows a simple construction with relatively few components.

The variance gear 1, which is pressed onto the basic transmission input shaft 4 only in the final assembling step, is arranged outside the mentioned interior space. The housing is open to the input side, i.e. to the left side in FIG. 1. During operation, the input side opening of the pot-shaped housing part 7 is completely sealed against a motor housing not shown, so that after the mounting of the motor, the interior space of the transmission has only one opening necessary for the protrusion of the output shaft 17. The output shaft 17 is sealed against the base 6 of the housing with a seal 20.

In the embodiment shown, the housing is essentially open if looking from the wall plate 9, which forms the first bearing carrier plate, towards the input side B (thus, opposite to the input direction A). An input side section of the basic transmission input shaft 4, carrying the variance gear 1, protrudes freely from the wall plate 9 in the direction towards the input side B. This design simplifies the pressing of the variance gear onto the shaft during the assembling process. The pot-shaped embodiment of the housing part 7 with only one exit opening for the shaft 17, allows a very good sealing, which again allows a permanent lubrication of the transmission by means of an oil charge which does not need replacement over the entire service life.

Figure 4:
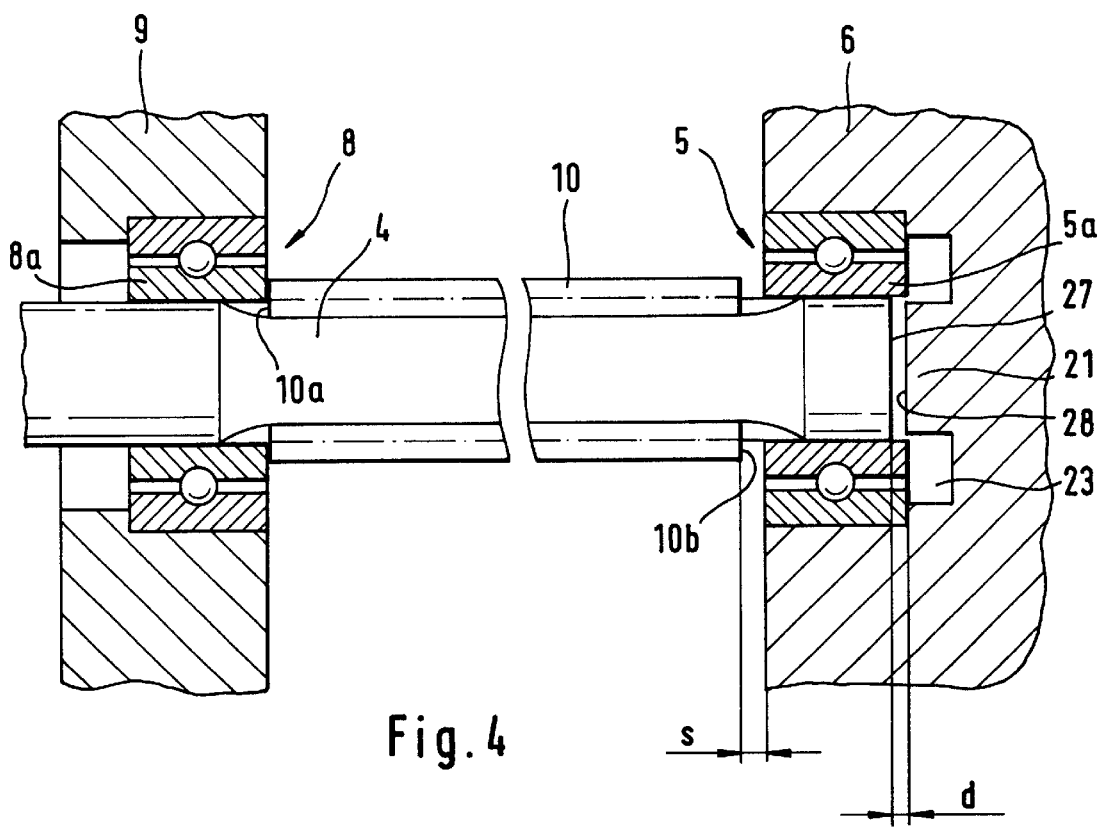
FIG. 4 a detailed view of FIG. 1 in the area of the bearings of the basic transmission input shaft.

At the side remote from the input side B, a support 21 for the basic transmission input shaft 4 is provided inside the housing, formed integrally with the base 6. The functional principle of the support is explained with reference to FIG. 4. The ball bearings 8, 5 of the basic transmission input shaft 4 are in fixed connection to the corresponding housing walls 9, 6. The basic transmission input shaft 4 is axially movable between the bearings 8, 5 within a tolerance range s. This movability (i.e. the tolerance range) is limited by the stop of the pinion 10 at the inner races of the bearings 8, 5. The tolerance ranges is, for example, 0.3 mm. In the state shown in FIG. 4, the basic transmission input shaft 4 is located in the position limiting its tolerance range to the input side (i.e. in the figure, to the left side), where the face 10a of the pinion 10 contacts the inner race of the bearing 8. In this position, the end face 27 of the basic transmission input shaft 4, remote from the input side B, is located at a distance d from the contact surface 28 of the stop 21. This distance d is smaller than the tolerance ranges. When the variance gear 1 is pressed on, the basic transmission input shaft 4 is shifted, due to the required pressure force, in input direction, i.e. to the right side in FIG. 1, until the end face 27 contacts the contact surface 28. Since the tolerance range s is larger than the distance d, the face 10b of the pinion 10 does not contact the inner race 5a of the bearing 5. Consequently, the pressure force is carried off to the housing part 6 via the support 21, and the ball bearing 5 remains free of forces.

During the operation of the transmission, the basic transmission input shaft 4 is, due to the common helical gearing of the gears, axially loaded so that the end face 27 of the basic transmission input shaft 4 contacts the contact surface 28 of the support 21. Preferably, the support 21 (in practice, the entire housing part 7) is made of a material which is less abrasion-resistant than the material of the basic transmission input shaft 4 in the area of its end face 27. Consequently, the friction causes abrasion of the support 21 during operation. This process continues until the face 10b of the pinion 10 contacts the inner race 5a of the bearing 5.

The support 21 is a housing protrusion surrounded by a ring-shaped groove 23. The groove 23 is dimensioned in such a manner that the rotation of the inner race of the corresponding ball bearing 5 is not affected. Preferably, the diameter of the support 21—as shown—is smaller than the diameter of the end face 27 of the basic transmission input shaft 4.

The surfaces where the basic transmission input shaft 4 and the support 21 contact each other (in the shown case, the end face 27 and the contact surface 28) are shaped, preferably, congruent to each other. Two circular surfaces with a plain contact—as shown—allow a particularly easy production. Thus, this represents the preferred embodiment. In order to ensure the necessary precise position of the contact surface 28 relative to the support 21, the contact surface 28 is preferably machined with a metal-cutting process, (e.g. milling or turning).

As it can be seen in FIG. 1, also the shaft 12 of the first subsequent transmission stage is prepared for the pressing-on of the variance gear 1 from the input side. To this end a support 22, analogous to support 21, is arranged in the housing. The shaft 12 freely extends from the inside of the transmission through the cover plate 9 towards the input side B. This makes it possible to provide transmissions with different stage numbers using the same housing (in the shown case, transmissions with two or three stages). In case of a two-stage transmission, the basic transmission input shaft 4 would not exist, and the variance gear 1 would be pressed onto the shaft 12, in this case forming the basic transmission input shaft of a basic transmission C, which comprises only one further stage (after the variance stage).

As a matter of course, this invention is not limited to the design shown in this embodiment example. Rather various variations are possible, basing on the described features. For example, the contact element of the basic transmission input shaft contacting the support during the pressing of the variance gear onto the shaft, does not necessarily have to be the end face of the basic transmission input shaft. As an alternative, the basic transmission input shaft may comprise a shaft collar contacting a correspondingly arranged support.

The preferred embodiment in which the support, fixed in relation to the housing, is formed by a protrusion formed integrally with the housing, is not absolutely necessary either. The only essential factor for the support is its function as a stop for the basic transmission input shaft during the pressing of the variance gear onto the shaft. This function can also be accomplished by a support which is a component separate from the housing. It can also be axially adjustable in relation to the housing, for example by means of a screw penetrating the housing wall. However, an embodiment with an unadjustable support, in relation to the housing, is preferred. On one hand, this simplifies production, and on the other hand, the housing does not have an opening necessary for the adjustment of the support, which could be a reason for leakage.

What is claimed is:

1. A transmission adapted for use with a motor, comprising:

a first transmission stage and at least one subsequent transmission stage;

a basic transmission comprising the at least one subsequent transmission stage and a basic transmission input shaft borne in a housing by means of rolling bearings; and a variance gear which is a part of the first transmission stage pressed onto the basic transmission input shaft from the input direction of the transmission and adapted to mesh with a drive pinion of the motor, wherein a support is located in a fixed position relative to the housing and arranged so that the basic transmission input shaft, under the effect of the pressure force necessary for pressing the variance gear onto the basic transmission input shaft, contacts the support, the support essentially bearing the pressure force and distributing it over the housing.

2. The transmission according to claim 1, wherein movability of the basic transmission input shaft in an axial direction is limited within a tolerance range relative to the housing, and wherein a maximum distance between the basic transmission input shaft and the support is smaller than the tolerance range.

3. The transmission according to claim 1, wherein the support is arranged in such a position that the basic transmission input shaft contacts the support, during the pressing of the variance gear onto the shaft, with the shaft end opposite to the input side of the transmission.

4. The transmission according to claim 1, wherein the position of the support is unadjustably fixed in relation to the housing.

5. The transmission according to claim 1, wherein the housing comprises a plate which is penetrated by the basic transmission input shaft, so that an input side section of the basic transmission input shaft, which carries the variance gear, protrudes from the plate towards the input side.

6. The transmission according to claim 5, wherein the housing is essentially open from the plate towards the input side.

7. A transmission according to claim 6, wherein an input side bearing of the basic transmission input shaft, is fixed to the plate, whereby the plate forms a bearing carrier plate.

8. A transmission according to claim 7, wherein the input side bearing of the basic transmission input shaft and an input side bearing of a shaft of a subsequent stage are fixed to the plate.

9. A transmission according to claim 5, wherein an input side bearing of the basic transmission input shaft, is fixed to the plate, whereby the plate forms a bearing carrier plate.

10. The transmission according to claim 9, wherein the housing comprises a second bearing carrier plate, in which at least the bearing of the basic transmission input shaft remote from the input side is fixed, whereas gears of the subsequent transmission stages are arranged in the basic transmission space formed between the bearing carrier plates.

11. The transmission according to claim 10, wherein the housing comprises a pot-shaped housing part with a base and a circumferential wall extending from the base and a cover part contacting a protrusion of the circumferential wall, whereas the base of the pot-shaped housing part forms the second bearing carrier plate remote from the input side.

12. A transmission according to claim 10, wherein at least one bearing remote from the input side of a shaft of a subsequent stage is fixed in the second bearing carrier plate.

13. A transmission according to claim 9, wherein the input side bearing of the basic transmission input shaft and an input side bearing of a shaft of a subsequent stage are fixed to the plate.

14. The transmission series comprising transmissions according to claim 1, wherein on the basis of a basic transmission which is common for a plurality of desired overall transmission ratios, the plurality of desired overall transmission ratios are produced by pressing different variance gears, which are adapted to mesh with corresponding motor pinions, onto a basic transmissions input shaft of identical basic transmissions.

15. A method for assembling a transmissions according to claim 1, wherein in a pre-assembly step, the basic transmission input shaft and the subsequent transmission stages are assembled in the housing, thus forming the basic transmission, and that in a final assembly step the variance gear is pressed onto the basic transmission input shaft, the basic transmission input shaft contacting the support under the effect of the applied pressure force.

16. A transmission according to claim 1, wherein the basic transmission input shaft has a diameter, near the rolling bearings of up to about 25 mm.

17. A transmission according to claim 16, wherein the diameter of the basic transmission input shaft is up to about 15 mm to about 20 mm.

18. A transmission according to claim 1, wherein an end of the basic transmission input shaft remote from the input side contacts the fixed support during operation of the transmission, said fixed support being designed also that it wears off in operation due to contact with the basic transmission input shaft.

* * * * *